March 5, 1968  E. SCHREMPP  3,371,549
RESILIENT ROTARY DRIVING ELEMENTS AND SYSTEM THEREOF
Filed Sept. 8, 1966
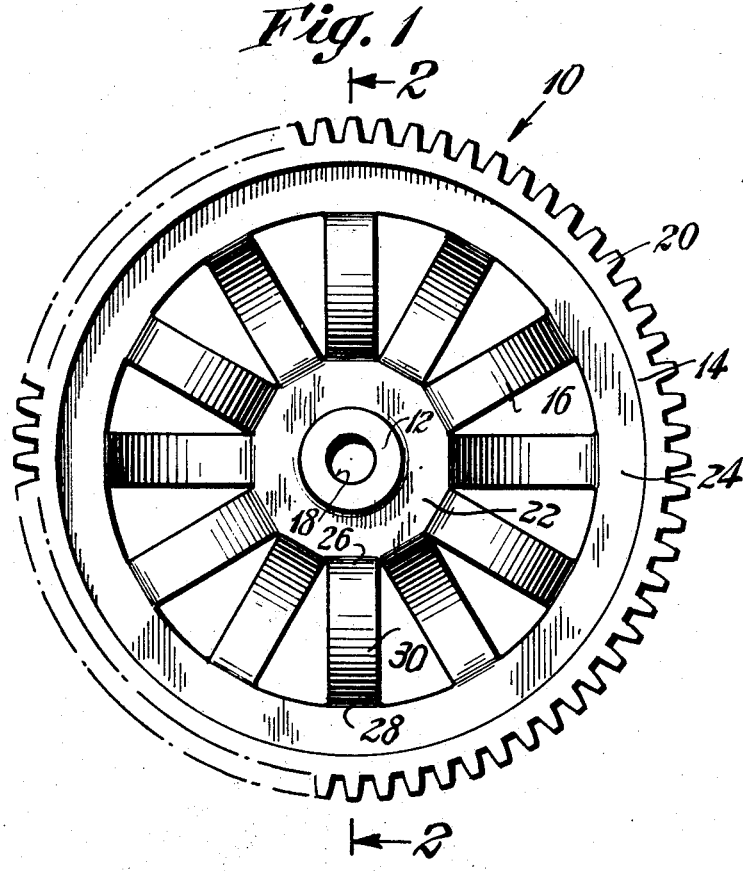
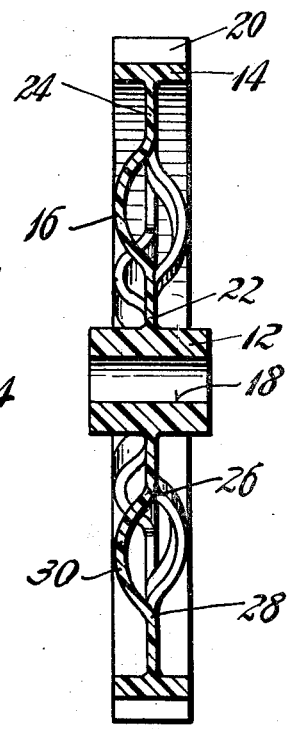
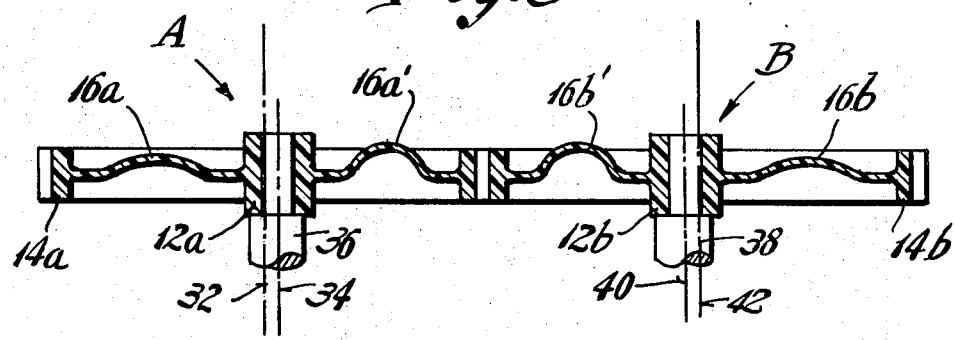
INVENTOR.
Ernst Schrempp
BY
Martin D. Wittstein
ATTORNEY United States Patent Office 3,371,549
Patented Mar. 5, 1968

3,371,549
RESILIENT ROTARY DRIVING ELEMENTS
AND SYSTEM THEREOF
Ernst Schrempp, Norwalk, Conn., assignor to Pitney-Bowes, Inc., Stamford, Conn., a corporation of Delaware
Filed Sept. 8, 1966, Ser. No. 577,851
9 Claims. (Cl. 74—411)

This invention relates generally to improvements in rotary driving or motion transmitting elements, and more particularly to such elements as gears, sprockets, and pulleys which are formed entirely of a resilient material. The invention further relates to a motion transmitting system having two or more such motion transmitting elements coacting in driving relationship.

A principal object of the present invention is to provide an improved integral one-piece rotary driving element in which a central hub and an annular rim are connected by a portion of the element which is deformable so that under load the rotative axis of the rim may be disposed in non-coaxial relationship with the rotative axis of the hub.

Another principal object of the invention is to provide an improved motion transmitting system composed of two or more such rotary driving elements in which a central hub and an annular rim of each element are connected by a portion which is deformable so that the spaced parallel rotative axis of the hubs may be closer together than the spaced parallel rotative axis of the corresponding rims.

In the art of mechanical motion transmission, particularly with regard to rotary gears, sprockets and chain, or toothed pulleys and endless belt, a major problem frequently encountered is that of proper spacing between the rotative axes of the driving and driven elements. This problem arises principally from two antagonistic characteristics of such elements, firstly that while a certain degree of play is desirable in rigid gear trains to achieve high efficiency and preclude excessive wear, excessive play precludes accurate motion transmission and also invites excessive tooth wear. On the other hand, while a high degree of motion transmission accuracy is achieved by reducing play or backlash to an absolute minimum, such tolerance reduction is purchased only at high manufacturing cost.

Heretofore, these problems have been satisfactorily solved by a combination of highly precise machining of shafts, bushings or bearings, mountings, etc., and extremely precise machining of gear teeth to conform to a variety of accurately designed tooth configurations. Such procedures, however, are considerably expensive in regard to both design and manufacturing techniques and are consequently not acceptable in many circumstances. Also, depending upon the degree of precision required for a particular case, these procedures involve so many possibilities for tolerance error that, in spite of best efforts to the contrary, the elements can mesh so tightly as to lose efficiency in transmitting motion or even suffer damage, or they mesh loosely enough so as not to transmit motion with the required precision.

An alternative prior art solution to precision work on all parts of the rotary element or the system of elements is to make the rotary element with a resilient connection between the rim and the hub so that during operation of the rotative axis of the rim may be disposed in spaced parallel relation with, or eccentric to the rotative axis of the hub, thereby permitting the rim to adjust itself to a range of accuracy within the precision of machined parts of the element or system. Accordingly, elements are known in which a rigid hub and a rigid tooth carrying rim are resiliently connected to permit radial displacement of one with respect to the other, such that the meshing teeth of each element maintain close fitting contact for accuracy in the transmission of power and yet mesh easily relatively to each other to maintain a high degree of efficiency and to prevent excessive wear and tear on the elements. Such elements, however, are formed of a plurality of components, sometimes involving dissimilar materials, and therefore require different manufacturing techniques followed by an assembly procedure. These elements are therefore relatively costly to produce and also are subject to mechanical failure by reason of connecting parts.

The present invention provides an improvement in the type of rotary driving element referred to above, and in systems composed of a plurality of such elements, and incorporates the significant advantages thereof but avoids the disadvantages of those constructions. Briefly, the principles of the invention are embodied in a rotary element having a hub, a rim, and a plurality of radially extending ribs connecting the hub and the rim, the entire member being formed of a resilient material as an integral, one-piece injection molding, i.e. born to final shape in the mold. Preferably the rotary element is molded of a thermoplastic material having the desired properties of sufficient rigidity to have force transmitting strength and yet sufficient resilience to deform under load in the area of the radial ribs.

In a preferred embodiment of the invention, the ribs are relatively flat and are disposed partly in the plane of the rotary element, each rib, however, being bowed slightly out of that plane so as to have a length slightly greater than the radial distance between the hub and the rim measured in the plane of the rotary element. A rotary element designed in accordance with the invention thus possesses a permissible degree of eccentricity between the rotative axis of the rim and the hub which is not in excess of two percent of the radius of the rim.

Another object of the present invention is to provide a rotary driving element which is formed entirely of a single resilient material by injection molding so that the element is simple and inexpensive to produce in large quantities.

A further object of the present invention is to provide a rotary driving element which is highly resistant to circumferential or peripheral deformation when under load from an interference fit with another element, as well as to torsional deformation where under driving load.

A still further object of the present invention is to provide a rotary driving element which is highly resistant to bending out of its normal plane when under load from an interference fit with another element.

These and other objects and advantages of the present invention will be more readily apparent from an understanding of the following detailed description when considered in conjunction with the accompanying drawings, in which:

FIG. 1 is a side view of a gear constructed in accordance with the principles of the present invention;

FIG. 2 is a sectional view taken on the line 2—2 of FIG. 1; and

FIG. 3 is a sectional view illustrating a motion transmitting system consisting of a pair of gears of the type shown in FIGS. 1 and 2.

Referring now to the drawings and particularly to FIGS. 1 and 2 thereof, there is shown a gear 10 which comprises generally a hub 12, a rim 14 and a plurality of radially extending ribs 16 interconnecting the hub 12 and the rim 14. The hub 12 is provided with a bore 18 adapted to receive a driving or driven shaft and to which the hub 12 is normally made fast by any suitable means. The rim 14 comprises an annular body portion having a suitable width and being provided with teeth 20 for driving connection with another gear.

A radially outwardly projecting flange 22 is integrally joined to the hub 12 at a point midway between its axial ends, and a similar radially inwardly projecting flange 24 is integrally joined to the rim 14 at a point midway between its axial ends. The flanges are interconnected by the ribs 16 which have opposite ends integrally joined with the flanges.

Each rib 16 is a relatively flat, thin strip-like elongated member disposed partly in the central plane of the gear 10 such that the planar dimensions of the rib are generally parallel to the central plane of the gear. Each rib 16 has opposite end portions 26 and 28 which are integrally joined with the internal and external flanges 22 and 24 respectively. Between these end portions is disposed a major portion 30 of the radial length of each rib 16, this major portion 30 being bowed out of the central plane of the gear 10 and preferably having the configuration of a true arc of a circle between the end portions 26 and 28. Thus each rib 16 from end to end has an axial length in excess of the radial distance between corresponding points on the internal and external flanges 22 and 24 respectively of the gear 10.

In order to prevent the rim 14 from bending out of its normal plane when placed under load, adjacent ribs 16 are bowed in opposite directions out of the central plane of the gear 10. It is therefore preferable to have an even number of ribs so that there will be as many bowed in one direction as there are in the other and, consequently an even distribution of the bending forces in both directions.

In the normal unstressed configuration of the gear 10 where the rotative axis of the hub 12 is coaxial with the rotative axis of the rim 14, the mid-portion 30 of each rib is constructed so that it does not project beyond the plane of the side face of the rim 14 toward which the mid-portion 30 of the rib projects, as best seen in FIG. 2. With this configuration, each rib 16 has a length in relation to the normal radius of the gear such that the amount by which the rotative axis of the rim can be displaced from the rotative axis of the hub will not exceed 2% of the normal radius of the gear under maximum deformation of opposed ribs when the gear is under load.

The above principle is better understood by reference to FIG. 3. Considering either of the gears A or B individually, for example the gear A, the line 32 indicates the rotative axis of the rim 14a, while the line 34 indicates the rotative axis of the hub 12a under a particular condition of load. It will be seen that the left hand rig 16a has flattened out while the right hand rib 16a' has increased in curvature. The distance between the lines 32 and 34 represents the amount by which the respective rotative axes may be disposed in non-coaxial relationship, and the configuration of the ribs 16 is such that this distance shall not exceed 2% of the normal unstressed radius of the gear. Preferably, the configuration of the ribs 16 is such that the distance between the lines 32 and 34 is held to within the range of 1.1% to 1.7% of the normal unstressed radius of the gear.

The entire gear 10 is formed of a single homogeneous mass of a thermoplastic material of which the following materials have been found to possess the necessary characteristics and degrees of elasticity and rigidity required for gear construction: acetals, either homopolymer or copolymer, polycarbonates, acrylonitride butadiene styrenes, polyamides, polystyrenes, polypropylenes, polyphenylene oxides, polysulfones and elastomers such as urethane, or the filled derivative of any of the above. These materials, in addition to their desirable characteristics of rigidity in the solid hub and rim portions and elasticity in the rib portions, are also chemically inert, good electrical insulators, and have low coefficients of friction.

The above materials also lend themselves to injection molding procedures. Accordingly the gears are preferably formed in this manner so that the entire gear is an integral, one-piece born to shape unit when it is removed from the mold.

Referring again to FIG. 3, a motion transmission system is shown in which two gears of the type described above are associated in driving relationship. The gear A is mounted on a shaft 36 which is coaxial with the hub axis 34, the gear B being mounted on a shaft 38 which is coaxial with the hub axis 40 of that gear. The shafts 36 and 38 are mounted such that the distance Y between their axes is less than the distance X between the rim axes 32 and 42 of the gears A and B respectively, this distance corresponding to the sum of the pitch radii of the gears A and B. Thus, in order to transmit motion from one of the shafts 36 or 38 to the other, the rims 14a and 14b are eccentric relative to the hubs 12a and 12b by virtue of the ribs 16a and 16b being decreased in curvature and the ribs 16a' and 16b' being increased in curvature.

It has been found that gears constructed in accordance with the principles of this invention and mounted to have an interference fit with each other operate with better than 90% efficiency. Such gears therefore achieve the aforementioned objects and at the same time avoid the disadvantages of prior art structures.

It is to be understood that the specific embodiment described above and shown in the accompanying drawings is merely illustrative of the principles of the present invention, and that the invention is susceptible to such variations, modifications and equivalents thereof as may be deemed to be within the scope of the appended claims.

I claim:

1. A rotary motion transmitting element comprising
   (A) a hub adapted to be mounted on a shaft;
   (B) a rim having spaced circumferential teeth thereon, and
   (C) a plurality of radially extending elongate ribs interconnecting said hub and said rim, said ribs being bowed to have an axial length slightly greater than the radial distance between said hub and said rim,
   (D) said rotary element being formed entirely of a single homogeneous mass of thermoplastic material as an integral one-piece born to shape molding whereby said ribs may deform to permit said rim to become eccentric relative to said hub upon the application of an external radial force to said rim.

2. A rotary element as set forth in claim 1 wherein said ribs are relatively flat strip-like members disposed partly in the central plane of the rotary element but having at least a mid-portion of each rib bowed out of the central plane of the rotary member.

3. A rotary element as set forth in claim 2 wherein said ribs are integrally joined with said hub and said rim centrally of the opposite sides of said hub and said rim.

4. A rotary element as set forth in claim 2 wherein adjacent ribs are bowed out of the central plane of the rotary element in opposite directions axially of the rotary element.

5. A rotary element as set forth in claim 2 wherein said ribs are bowed to a curvature such that upon maximum deformation of opposed ribs the radial distance between the rotative axes of the rib and the hub does not exceed two percent of the normal radius of the rim.

6. A rotary motion transmitting element comprising
   (A) a hub adapted to be mounted on a shaft;
   (B) a rim having spaced circumferential teeth thereon, and
   (C) a plurality of radially extending elongate ribs interconnecting said hub and said rim, said ribs being relatively flat strip-like members connected at their opposite ends to said hub and said rim but having a mid-portion intermediate said ends being bowed substantially in the arc of a circle between said ends whereby said ribs have an axial length slightly greater than the radial distance between said hub and said rim, said ribs being formed of a thermoplastic material whereby said ribs may deform to permit said rim to become eccentric relative to said hub upon the application of an external force to said rim.

7. A rotary element as set forth in claim 6 wherein said ribs are bowed to a curvature such that upon maximum deformation of opposed ribs the radial distance between the rotative axes of the rib and the hub does not exceed two percent of the normal radius of the rim.

8. A rotary motion transmitting system comprising:
(A) a plurality of rotary motion transmitting elements interconnected for transmitting rotary motion from one to the other, each of said rotary elements having
(B) a hub adapted to be mounted on a shaft,
(C) a rim circumferential teeth thereon and
(D) a plurality of radially extending elongate ribs interconnecting said hub and said rim, said ribs being bowed to have an axial length slightly greater than the radial distance between said hub and said rim,
(E) said rotary element each being formed entirely of a single homogeneous mass of thermoplastic material as an integral one-piece born to shape molding whereby the ribs of each element may deform to permit the rim of each element to become eccentric relative to its associated hub upon the application of an external force to said rims during normal operation of said rotary elements.

9. A rotary motion transmitting system comprising:
(A) a pair of gears each having a hub adapted to be mounted on a shaft, a rim having circumferential teeth thereon and means connecting the hub with the rim,
(B) said gears being mounted with adjacent teeth of each gear meshed in driving relationship and with the axes of rotation spaced from each a distance slightly less than the sum of the pitch radii of said gears,
(C) the hub and rim connecting means of said gears comprising a plurality of radially extending ribs joined to said hubs and rims and being bowed to have an axial length slightly greater than the radial distance between said hub and rim,
(D) said gears being formed entirely of a single homogeneous mass of thermoplastic material as an integral one-piece born to shape molding whereby the rims of said gears are eccentric relative to the hubs of said gears during normal operation of said gears.

References Cited

UNITED STATES PATENTS 3,300,835    1/1967    Barr _____ 74—243
3,304,924    2/1967    Dolza _____ 74—243 X DONLEY J. STOCKING, *Primary Examiner.*

L. H. GERIN, *Assistant Examiner.*